May 5, 1931.  W. J. SIMONDS ET AL  1,803,735
BEARING FOR WOOD ROLLS
Filed March 25, 1929
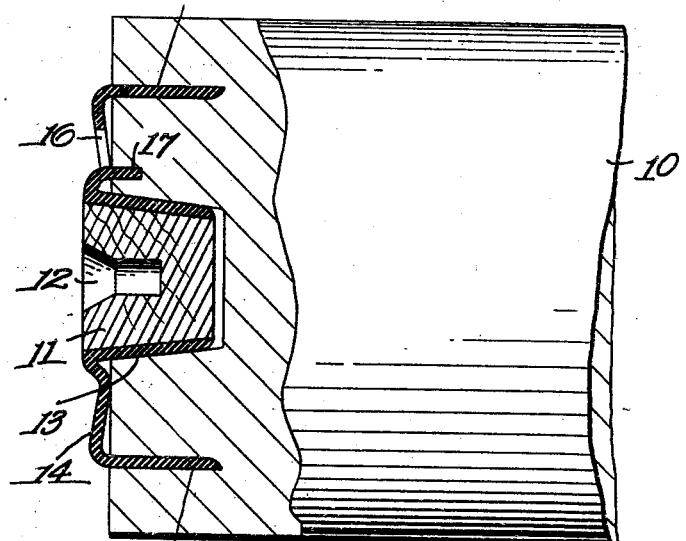
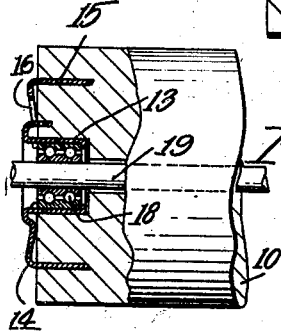
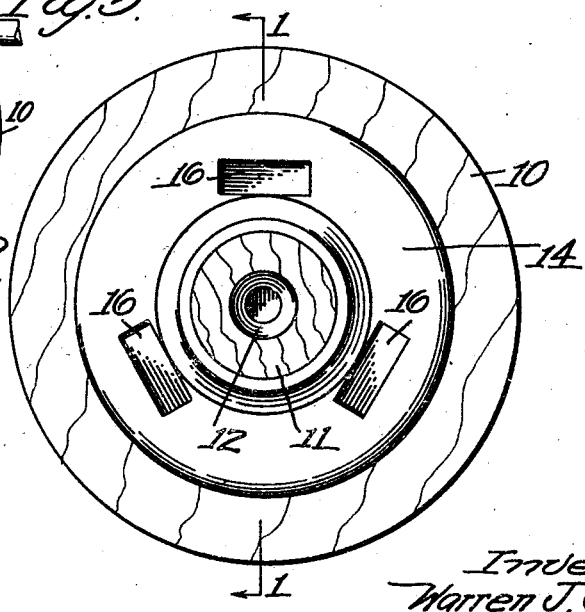
Inventors.
Warren J. Simonds
Carl C. Harris Patented May 5, 1931

1,803,735

UNITED STATES PATENT OFFICE

WARREN J. SIMONDS AND CARL C. HARRIS, OF ORANGE, MASSACHUSETTS, ASSIGNORS TO RODNEY HUNT MACHINE COMPANY, OF ORANGE, MASSACHUSETTS, A CORPORATION OF MASSACHUSETTS

BEARING FOR WOOD ROLLS

Application filed March 25, 1929. Serial No. 349,708.

This invention relates to bearings for wooden rollers for use in the textile and paper industries.

The principal objects of the invention are to provide effective means for holding a bearing in the end of the roll and to insure the retention of said bearing in proper position; to provide this holding means in a form in which a wooden bearing can be renewed readily and to provide for taking it up in case of shrinkage.

Other objects and advantages of the invention will appear hereinafter.

Reference is to be had to the accompanying drawings in which

Fig. 1 is a diametrical longitudinal sectional view of a wood roll with a holding plate for a wooden bearing block constructed in accordance with this invention, being taken on the line 1—1 of Fig. 2;

Fig. 2 is an end view of the same, and

Fig. 3 is a view similar to Fig. 1 showing the invention applied to a ball bearing.

The roll 10 to which this invention is applied may be a wooden roll for use in textile or paper making or other industries. These rolls are often built in large sizes and the difficulties that involve their supports at the ends or on a shaft passing through are well known. This invention, although capable of being applied to a shaft running all the way through the roll, is shown in Figs. 1 and 2 as employed in connection with conical centers for supporting the opposite ends.

For the purpose of receiving the conical center, blocks 11 of treated, self lubricated, hard wood are employed at the ends of the roll. If these are to receive conical centers, they are provided with a conical opening 12, but if they are to receive a shaft, of course the wooden bearing is bored all the way through and the roll 10 also.

For the purpose of frictionally uniting the bearing block 11 with the roll, which is or may be of the same material or of different qualities of the same material, the block or bearing 11 is made slightly conical and is driven or forced into a conical collar 13 which may be formed of sheet metal and provided with a substantially flat annular body 14 projecting outwardly from it and bearing on the end of the wood roll 10 preferably. The metal piece also has a cylindrical flange 15 that is driven in a groove formed in the end of the wooden roll. It will be understood that the collar 13 is driven into a conical hole formed in the roll and all parts are thus firmly united with the roll itself.

The body portion 14 of the metallic member of the device is shown as provided with several perforations 16 and the metal taken from these perforations is bent inwardly to form a straight wedge 17 which, when the whole device is applied, is driven into the end of the roll with the grain. This constitutes additional anchoring means and if desired separate wedges can be driven through the openings 16.

It will be seen that by anchoring the plug 11 with a driving fit in the collar 13 and driving the metal piece into the end of the wood in the manner above described the whole bearing is firmly anchored in place and it constitutes a permanent and very rigid bearing which will not be easily displaced or injured and will last as long as the roll itself. Also the wooden bearing block is easily renewed when worn and it can be driven in if shrinkage loosens it. It will also be seen that it will be equally adapted for supporting the roll on conical centers or on a shaft passing through by ordinary modifications in the bearing block.

In the form of the invention shown in Fig. 3 a ball bearing 18 has its outer race anchored in the flange 13 which in this case is not so flaring as in Fig. 1. This is shown also as applied to a shaft 19 extending through the roll. Ball or roller bearings are frequently inserted in the end of wood rolls, and only have the wood to hold them. The steel flange transfers the load to the rim of the flange, and nearer the outside of the wood roll, and is a much more durable construction. This applies especially to laminated or made up stave rolls, to which it is difficult to fit ball bearings, and which are used so much in dryers where temperatures are higher than room temperatures.

Although we have illustrated and described only a single form of the invention, we are aware of the fact that modifications can be made therein by any person skilled in the art without departing from the scope of the invention as expressed in the claims.

Therefore, we do not wish to be limited to all the details of construction herein shown and described but what we do claim is:—

1. A device for anchoring a bearing in the end of a roll comprising a metal cap of annular shape having a flange projecting from its outer edge and adapted to be driven into the end of the roll and a conical collar constituting its center and adapted to be driven into the roll and a wooden bearing block of conical shape driven into the conical collar and permanently held therein.

2. The combination with a wooden roll, of a body of sheet metal of nearly flat annular shape having a cylindrical flange integrally projecting from its outer edge and adapted to be driven into the wooden roll and an integral conical collar constituting its center and adapted to be driven into the wooden roll, and a wooden, self lubricating bearing block driven into the conical collar and permanently held therein and projecting beyond the end of the roll.

3. The combination with a roll having a circular groove in its end and a conical depression at the center and in the center of said groove extending into the end of the roll only a short distance, of a bearing adapted to enter said depression and a metal holder for the bearing having a central collar for receiving the bearing and fitting with a driving fit in the depression, said metal holder having a transverse flange at its edge driven into the roll, said holder having projections extending therefrom and driven into the roll to help hold it in position.

In testimony whereof we have hereunto affixed our signatures.

WARREN J. SIMONDS.
CARL C. HARRIS.